April 27, 1965 J. B. STOTHERS ETAL 3,180,823
SEPARATION OF HIGH VISCOSITY INDEX COMPONENTS FROM
LUBE DISTILLATES BY THERMAL DIFFUSION
Filed Oct. 9, 1961 2 Sheets-Sheet 1
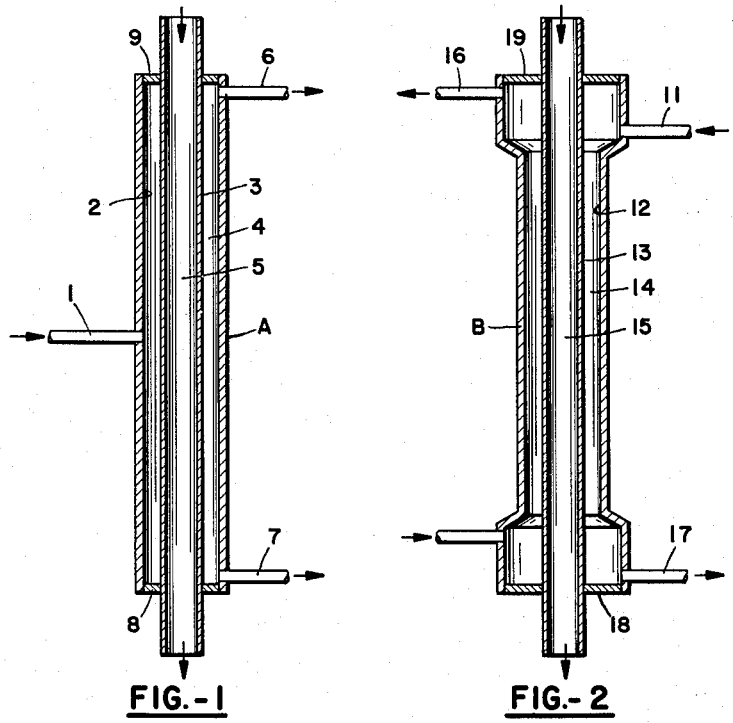
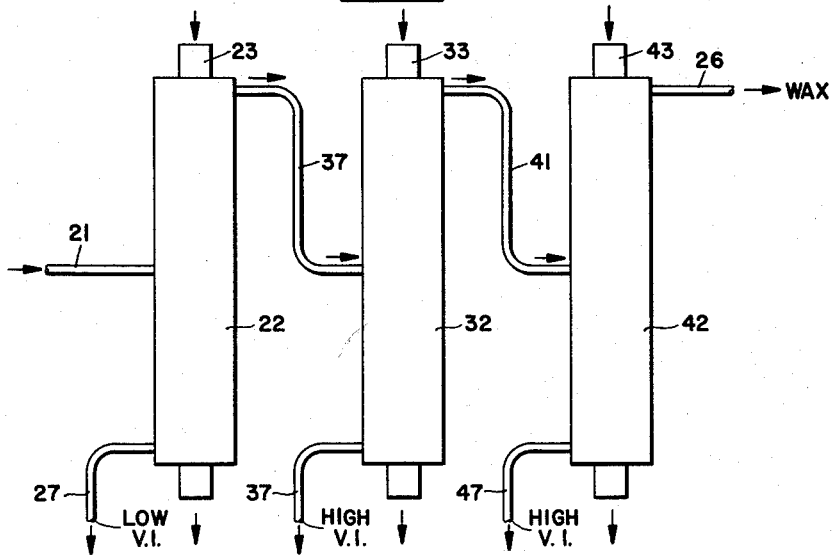
John B. Stothers
Jack Walker  INVENTORS
BY *Richard H. Nagel*
PATENT ATTORNEY

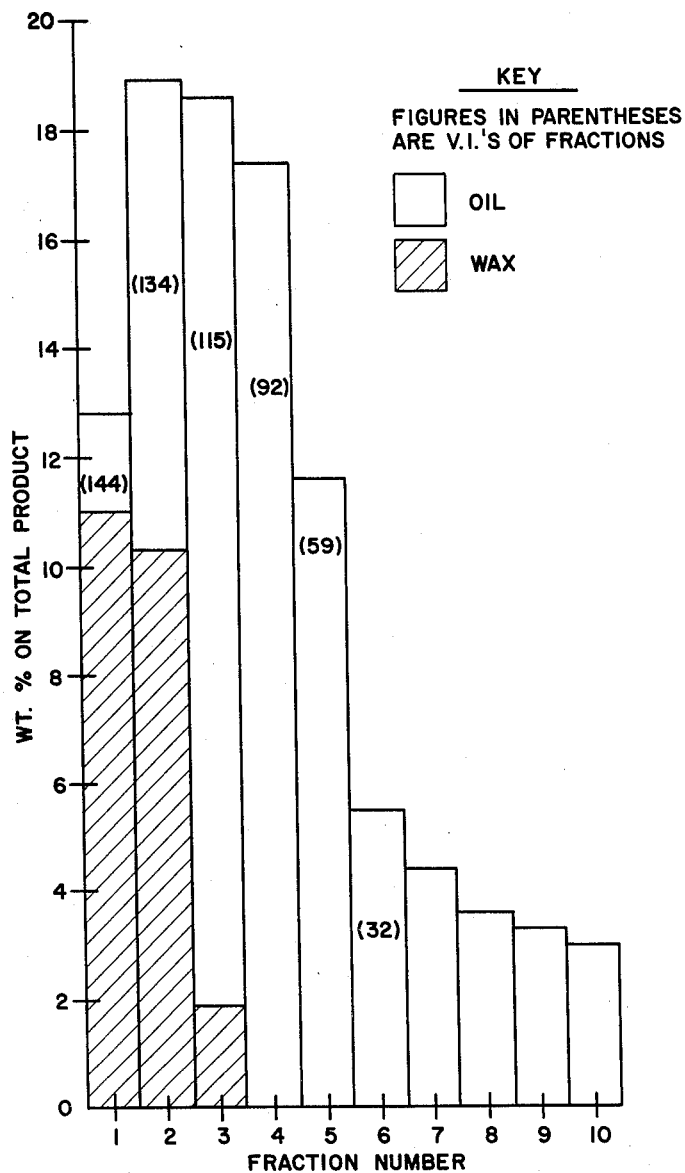

> 3,180,823
> SEPARATION OF HIGH VISCOSITY INDEX COMPONENTS FROM LUBE DISTILLATES BY THERMAL DIFFUSION
> John B. Stothers, London, Ontario, and Jack Walker, Sarnia, Ontario, Canada, assignors to Esso Research and Engineering Company, a corporation of Delaware
> Filed Oct. 9, 1961, Ser. No. 143,946
> 14 Claims. (Cl. 208—308)

The present invention relates to a method of separating dissimilar materials by thermal diffusion wherein the rate of separation is substantially increased by the addition of certain chemical compounds. More particularly, this invention relates to a process of separating dissimilar hydrocarbons by a thermal diffusion process while said materials are in the liquid state. Specifically, this invention relates to a process of improving the rate of separation of high viscosity index components in lubricating oil stock from the low viscosity index components in said stock by a process of thermal diffusion wherein the separation of rate increase is obtained by adding to the lubricating oil stock certain thermal diffusion separation accelerators. This process can also be used in the separation of wax from waxy oil lubricating stocks. The dissimilar materials that are to be separated in accordance with the present invention under the conditions of the separation by thermal diffusion remain in the liquid state.

It has been known that dissimilar materials might be separated by a process of thermal diffusion. Although this process is one of the best known methods of obtaining qualitative separation of materials, it is not economically attractive because it is very slow, it has a high requirement of low intensity heat per unit volume of product made, and the volume of product has not been sufficiently large to make the process practical. Further, the working capacity of the equipment used to date is small in relation to its gross physical size, and the heat load of the process is high and consists mainly of irreversible heat transfer. Any means that can be found to increase the rate of separation will diminish all of the above disadvantages since in a continuous operation a unit of fixed size can be operated at greater space velocity while the heat load will not be appreciably increased. The theory of the thermogravitational diffusion column is extremely complex. Even in the case of simple binary mixtures, the experimental studies on such mixtures have shown only partially quantitative agreement between experiment and theory. The separation achieved and the rate of separation are inversely proportional to, roughly, the 4th and 7th powers, respectively, of the spacing between the plates so that there is no direct way around the disadvantage of the working capacity of the equipment being small in relation to its gross size.

While the present invention is not to be limited by any theory presented herein, it is believed that the phenomenon of liquid thermal diffusion may be explained on the theory that the molecules of one component acquire greater kinetic energy of translation by absorption of heat from the hot surface than do the molecules of the other component and that, as a result, those molecules acquiring the higher kinetic energy of translation will tend to concentrate in a layer of fluid adjacent the cold surface; whereas, those acquiring less kinetic energy of translation will tend to concentrate in a layer adjacent the hot surface. If the slit is vertical or has a vertical component, a convection current is set up by the temperature gradient in the slit so that the liquid adjacent the hot surface will rise and the liquid adjacent the cold surface will descend, with the result that the molecules having greater kinetic energy of translation imparted to them and tending to concentrate next to the cold surface pass downwardly into the lower part of the slit; whereas, the molecules having lesser kinetic energy of translation and tending to concentrate adjacent the hot surface will rise into the upper part of the slit.

In view of the fact that the apparatus required to carry out a thermal diffusion separation has inherent limitations as to the amount of material that may be separated, in order to obtain better separations, it is necessary to increase the rate at which the materials are separated.

It is an object of this invention to provide an efficient process of separating dissimilar materials by substantially increasing the rate of separation of the dissimilar components by the addition of our thermal diffusion separation accelerators to a feed which is to undergo thermal diffusion. It is another object of our invention to provide an improved rate of separation of dissimilar components present in petroleum hydrocarbon fractions. Still another object of our invention is to provide increased rates of separating high V.I. components of lubricating oil stocks from low V.I. components of lubricating stocks by adding to a lubricating stock, which is to undergo a thermal diffusion separation, the separation accelerators of this invention. A still further object of our invention is to provide an efficient method of separating wax from waxy oil lubricating stocks by subjecting feed stocks in the presence of the separation accelerators of this invention to a thermal diffusion step which removes the wax from both high and low V.I. components of the lubricating stock.

In accordance with the present invention, a mixture of dissimilar materials is separated into its components by charging the material to be separated to an area between two closely spaced parallel plates held vertically or inclined to the horizon. The two plates are maintained at different temperatures; one being relatively hot and the other being relatively cold. The material to be separated in contacting these plates is separated into its component parts by virtue of the thermogravitational effect of the temperature gradient across the plates, which plates are held at different temperatures. Part of the mixture adsorbs energy at a higher rate and diffuses to the cold wall and passes downward to the bottom of the plates. Other of the components adsorb energy at a slower rate and diffuse toward the hot wall and pass upwardly to the top of the plates. The feed may be charged to the diffusion apparatus at a point equidistant between the top product takeoff and the bottom product takeoff or at both the top and bottom of the column or through a multiplicity of feed lines between the top and bottom of the plates. Also the products may be taken from the column at the top, at the bottom, or in between, or fraction may be taken at an intermediate distance between the top and the bottom of the diffusion apparatus. The process may be carried out in a continuous or batch type operation. Where a diffusion column is used, the width of the spacing between the two plates is determined by the outside diameter of the inner column and the inside diameter of the outer column. The distance between these two columns makes up what is known as the annular slit. The width of the slit is constant throughout the column. Either the inner column or the outer column may be the hot or cold wall surface. Where the inner column is the cold wall, cooling may be provided by passing a cold liquid through the inner column, and the outer wall may be electrically heated by wrapping the column with a heated coil. In order to obtain the substantial rate of separation realized by the present invention, the materials to be separated are first mixed with between 25/75 to 75/25 parts by volume of one of the separation accelerators of this invention. The slit width and the height of the column are selected in order to obtain the maximum amount of product commensurate with the desired degree of separation and capacity of the apparatus. The flow rates and the temperature of the hot and cold walls and, accordingly, the temperature gradient between the hot and cold wall, will determine to a certain extent the volume and quality of product obtained. Normally the separation is carried out at atmospheric pressure. However, where separation accelerators are used which are vaporized at the temperature of the hot wall, the separation may be carried out at super-atmospheric pressures which are sufficient to maintain the material being separated and the diffusion accelerator in the liquid state. In a continuous operation, the separation is carried out for a period of time sufficient to obtain the desired amount of separation product. In a batch operation the separation is carried out for a period of time of a few minutes up to several days or more until the desired separation is accomplished.

One of the advantages of our improvement is that separations between petroleum hydrocarbon distillates which have previously been found to be qualitatively satisfactory are now made to be quantitatively attractive. By addition of the separation accelerators of this invention to the materials to be separated, we have obtained an increase in the separation rate, while maintaining the quality of separation, of between 400 and about 1000% with only a fractional increase in the amount of heat energy required for the improved separation rate. Another important advantage of this process is that it can now be economically applied to the separation of a large variety of components and it is of wide application since it has been demonstrated that components having the same or very nearly the same boiling point and even stereo and other isomers having exceedingly similar properties can be effectively separated by liquid thermal diffusion.

The term "separation" as used herein is intended to include not only separation in the ordinary sense of the word but also concentration, enrichment, rectification, and purification.

FIGURE I of the drawings shows a thermal diffusion column wherein the feed is charged at about the center of the column and the products are taken off at the top and at the bottom of the column.

FIGURE II of the drawings shows a similar type thermal diffusion column wherein the feed to be separated is simultaneously charged to both the top and bottom of the column while, at the same time, products are removed from the top and bottom of the column.

FIGURE III of the drawings shows apparatus wherein a particular separation, for example, wax from a lube stock, is obtained. The wax product is removed from the top of the third column while products varying from low V.I. to high V.I. are removed from the bottom of the columns.

FIGURE IV of the drawings graphically shows the results obtained in a batch type thermal diffusion operation wherein products were separated at ten equally spaced points along the thermal diffusion column.

The term "dissimilar materials" as used herein is intended to refer to a mixture of two or more dissimilar components. The components may be part of a petroleum distillate, or may be substantially pure compounds. This invention also includes separating dissimilar components of waxy oil petroleum hydrocarbons. Feeds coming within the scope of this invention are raw petroleum lube oil stocks and solvent extracted petroleum lube oil stocks. It is also possible to separate waxes from waxy oil mixtures. The dissimilar materials that are to be separated are free of solid components and are liquid under the conditions of thermal diffusion.

We have unexpectedly found that certain chemical compounds will substantially increase the rate of separation of physically and/or chemically dissimilar materials in a thermal diffusion process. It is noted at this point that the separation by thermal diffusion of dissimilar components is a physical separation rather than a chemical reaction. In order to facilitate description of the compounds involved, they have been referred to throughout the specification as thermal diffusion separation accelerators. The accelerators that are used in accordance with this invention are miscible with the materials to be separated over the operating temperatures of the diffusion apparatus. The accelerators do not boil at a temperature below the hot wall temperature nor do they freeze at a temperature above the cold wall temperature.

Specific separation accelerators that have been found to be very efficient are 1,1,2,2-tetrachloroethane, 1,2-dibromoethane, n-decane, and xylene. Solvents found to be either ineffective or detrimental are chlorobenzene, n-butanol, and decaline. Some of the physical properties of these compounds are given in Table I:

*Table I*

PHYSICAL PROPERTIES OF SEPARATION ACCELERATORS AND BLENDS

| Diluent | Molar volume V, ml. (180° F.) | Ht. of vap'n $L_v$ (180° F.) cal./gram | Kinematic viscosity at 180° F., cS. | Dipole movement (Debye units) | Viscosity of 50% blend V 180° F., cS. |
|---|---|---|---|---|---|
| Base oil (MCT 30 stock) | 640.0 | 59.4 | 20.0 | | 20.00 |
| 1,1,2,2-tetrachloroethane | 116.4 | 58.5 | 0.498 | 1.85 | 1.97 |
| 1,2-dibromoethane | 91.5 | 47.8 | 0.386 | 1.12 | 1.365 |
| n-decane | 208.0 | 75.5 | 0.640 | 0 | 2.26 |
| Xylene | 130.6 | 87.5 | 0.411 | 0.37 | 1.53 |
| Chlorobenzene | 108.3 | 80.9 | 0.406 | 1.56 | 1.46 |
| n-Butanol | 97.0 | 150.0 | 0.936 | 1.68 | 2.75 |
| Decalin | 168.0 | 70.5 | | 0 | |

It is to be understood that the terms "hot" and "cold" as applied to the slit walls and "heating" and "cooling" as applied to the temperature controlling media are used in their relative rather than in their absolute sense. Where the material to be treated has a high boiling point, the temperatures of the cold and hot walls may be, for example, at 180° F. and 240° F., respectively. If, on the other hand, the material to be separated has a low boiling point, thermal diffusion may be carried out with one wall at a temperature of 0° F. (hot) and the other at −50° F. (cold). The heating media that may be used can be steam, heated electric wires, etc.; whereas, the cooling media may be cold water, ethylene, glycol, brine, etc. The hot wall temperature may be between 100° and 650° F. or up to the boiling point of the mixture and the cold wall temperature may be from the pour point of the material being treated up to about 600° F. Preferably, the temperature of the hot wall is 200–450° F. and the temperature of the cold wall is 100–200° F. The temperature difference between the hot and cold wall may be between 50 and 500° F. Preferably, however, the temperature gradient is about 200 to 300° F. However, depending on the slit width, the height and the volume of the diffusion column, the materials being separated, and the separation accelerator used, temperature gradients of 100–400° F. can be used. The temperature of the hot and cold walls, as well as the mean temperature between the walls will be below the boiling point and above the freezing point of the mixture being treated. The diffusion step is carried out normally at atmospheric pressures. However, sub-atmospheric as well as super-atmospheric pressures may be utilized, as long as the materials being separated are maintained in the liquid state.

Where the diffusion separation is carried out in a batch type process, it may be carried out for a period of a few minutes up to several days or more until sufficient time has elapsed to obtain the desired volume and quality of separation. Where a continuous process is used, the rate of feed, in U.S. gallons per day, per sq. ft. of heating surface, of .010 to 5.0 can be used, and the rate at which product is obtained will vary with the rate of feed. Feed rates of 0.5 to 3.5 can also be used. Preferably rates of about 1.0 to 2.0 are used and this again is dependent upon the quality and quantity of separation desired. As will be pointed out below in the numerous data supplied employing the diffusion separation accelerators of this invention, we were able to obtain an increase in rate of separation of 400–1000% while, at the same time, maintaining the quality and yield of products separated.

The thermal diffusion apparatus as contemplated to be used in accordance with the present invention may be constructed of any solid material, such as glass, metal, or any other solid material capable of conducting sufficient heat and having the structural strength necessary to maintain its shape. The annular gap or slit can be formed by any suitable arrangement of spaced walls, such as by means of concentric tubes or parallel plates. Some of the important variable of the thermal diffusion apparatus are the slit width; i.e. the distance between the hot and cold walls, the slit length; i.e. the length of the thermal diffusion section across which a temperature gradient is maintained, and the constancy of the temperature levels of the hot and cold walls that are required for a particular operation. Other factors which affect the operation of the apparatus are the surface area of walls of the slit; that is, the sum of the products of the length, and outside and inside circumferences of an inner and outer tube, respectively, and the position of the inlet ports or feed relative to the takeoff ports. The apparatus may be constructed in such a manner that there may be one or more inlet ports and one or more outlet ports. There may also be one or more thermal diffusion towers or columns. An important feature of our invention is that regardless of the particular variables which are used, the addition of the diffusion separation accelerators of this invention will increase the rate of separation.

The slit width contemplated is usually about 0.010 to 0.060 inch. Depending on the feed being used and the temperature gradients, slit widths of (0.02–0.04 inch) can also be used. However, for most separations carried out with petroleum lubricating stock distillates, slit widths of about 0.025 to 0.035 inch are preferred. The column height for any thermal diffusion column will be dependent to a certain extent upon the slit width and the temperature gradient. However, for some commercial purposes, a column height of 25–35 ft. would be utilized. However, when smaller volumes of material are to be separated, column heights in the range of 10–15 feet are used. On the other hand, for experimental uses, where only small quantities of materials need be separated in a given amount of time, column heights of 2 to 6 feet are used. The separation may be carried out in the same equipment either as a batch or a continuous method, and which is used will depend upon the amount of separation desired and the volume of products needed. The feed may enter at about the center of the column between two product outlets which are at either end, or may enter at either end proximate to product outlets. Where a difficult separation is to be carried out, more than one column may be used. Further it is not necessary to use concentric columns since other diffusion apparatus, for example parallel plates, may also be used. The improvement obtained by us in the separation of materials by thermal diffusion is not to be limited by any particular type of apparatus, as this process will improve the rates of separation in any type of thermal diffusion apparatus. Apparatus such as described in U.S. Patents 2,541,069 to 2,541,071 may be used.

Now referring to FIGURE 1 of the drawings, a petroleum lubricating stock boiling in the range of 900–1050° F. and having a viscosity index of about 90 is mixed with one of the thermal diffusion separation catalysts of this invention in the ratio of 25/75 to 75/25 of accelerator to petroleum lubricating stock and is charged through line 1 into thermal diffusion column A. The mixture of separation accelerator and lubricating stock fills annular gap 4. The outside wall of column 2 is heated electrically (by means not shown). The inside wall of column 3 is cooled by passing cold water through the inside of column 3, which is hollow, at a constant temperature. The material being treated in column A is retained in the column by baffles 8 and 9. The low viscosity index components of the mixture of lubricating stock (due to adsorbing heat from wall 2) migrate to cold wall 3 and descend to the bottom of column A and are withdrawn from line 7. The high viscosity index components of the lubricating distillate (due to being less active) migrate to the hot wall 2 and ascend to the top of column A and are withdrawn through line 6. In a continuous operation, feed is continually fed through line 1 and a desired amount of product of the desired quality is continuously removed from lines 6 and 7.

In the embodiment illustrated by FIGURE 2, a petroleum lubricating stock boiling in the range of 900–1050° F. and having a viscosity index of about 90 is mixed with one of the thermal diffusion separation catalysts of this invention in the ratio of 25/75 to 75/25 of accelerator to petroleum lubricating stock and is simultaneously charged through lines 11 and 20 into thermal diffusion column B. The mixture of separation accelerator and lubricating stock fills annular gap 14. The outside wall of column 12 is heated electrically (by means not shown). The inside wall 15 of column 13 is cooled by the passage of constant temperature cold water through hollow column 13. The material being treated in column B is retained in the column by baffles 18 and 19. The low viscosity index components of the mixture of lubricating stock (due to adsorbing heat from wall 12) migrate to cold wall 13 and descend to the bottom of column B and are withdrawn through line 17. The high viscosity index components of the lubricating distillate (due to being less active) migrate to the hot wall 12 and ascend to the top of column B and are withdrawn through line 16.

Where it is desirable to not only separate a high V.I. lubricating stock, but also to remove substantially all of the wax from the stock, apparatus such as that described in FIGURE 3 can be used. A waxy petroleum lubricating stock boiling in the range of 900–1050° F. and having a dewaxed V.I. of about 90 is mixed with about a 1/1 ratio of a thermal diffusion separation accelerator of this invention and charged through line 21 to the first of three thermal diffusion towers 22. Tower 22 is similar to towers A or B in FIGURES 1 or 2 respectively in that they have concentric walls, one of which is hot and the other of which is cold. In tower 22 there is a substantial separation of the high V.I. components from the low V.I. components with substantially all of the wax going with the high V.I. component. The high V.I. components and wax are withdrawn from the top of the tower 22 through line 31. The low V.I. components, substantially free of wax, are withdrawn from the bottom of the tower 22 through line 27. The high V.I. component with substantially all the wax is then charged to tower 32 in which a separation of high or intermediate V.I. oil components are withdrawn from the bottom of the tower through line 37 and a fraction containing substantially only wax and a small amount of high V.I. oil is withdrawn through line 41 and charged to thermal diffusion tower 42. In tower 42, the remainder of the high V.I. component oil is withdrawn from the bottom of the tower 42 through line 47 and substantially pure wax is withdrawn from the top of the tower 42 through line 26. In going from left to right in towers 22, 33, and 42, it may be found necessary to continually increase the mean temperature of the thermal diffusion process in order to maintain the wax in liquid form. The various components of the low V.I., intermediate V.I., and high V.I. bottom products of the three towers may be blended in order to obtain a lubricating stock of desired viscosity index and of low pour point.

Our invention is not in any particular apparatus in which it is utilized, but is in finding that certain chemical compounds, when mixed with dissimilar materials which are to be separated by a process of thermal diffusion, will increase the rate of separation by a factor of about four to ten. This invention may, therefore, be used in any type of thermal diffusion apparatus to separate generally any types of dissimilar compounds which would normally be susceptible to thermal diffusion separation. The invention therefore has a wide application with an innumerable number of materials to be separated. The following data and examples are given in order to specifically illustrate the operation and the utility of this invention, but without intending to limit in any way the scope of the claims.

EXAMPLE 1

A standard concentric cylinder thermal diffusion column is fitted with top and bottom takeoff points from which product can be removed quasi continuously by gear pumps controlled by cyclic timers. Feed was introduced at the center of the vertical axis of the column from a constant head gravity feed reservoir. In the process, the temperature of hot and cold walls was approximately 245° F. and 115° F., respectively. Normally, steady state operation was obtained in about 7 hours and about 17 hours' operation was used as a yield period. The products were collected in graduates, weighed and stripped of accelerator under nitrogen at about 10 millimeters pressure; the accelerator free oil was then weighed. The feed rate, viscosity index of the top and bottom product, and the volume fraction of top and bottom product, were recorded with each of the preferred separation accelerators of this invention.

The feed stock was a phenol extracted solvent dewaxed 30-grade distillation from Western Canadian crude, referred to as MCT 30, the characteristics of which are given below in Table II:

Table II
CHARACTERISTICS OF MCT 30 STOCK FEED

Boiling range _____ ° F__ 900 to 1050
Specific gravity, 60°/60° F. _____ 0.8866
Density, $D_4^{20}$ g./ml. _____ 0.8829
Refractive index, $n_D^{20}$ _____ 1.4872
Viscosity, 210° F. SUS _____ 67.67
Viscosity index _____ 90.0

The thermal diffusion apparatus used consisted of two concentric stainless steel pipes, arranged to have an annular gap of about 0.012 inch. The outside diameter of the inner tube was 0.627 inch; the inside diameter of the outer tube was 0.651 inch. The column was six feet in height and had a fluid capacity within the annular gap, or "slit" of about 30 milliliters. The outer tube, the hot wall, was heated electrically; the inner tube was cooled by passing a stream of thermostatic water through it. In the continuous operation, as carried out, feed oil or oil and separation accelerator was fed into the center of the column while products were withdrawn at each end, in apparatus similar to that described in FIGURE 1 of the drawings.

In order to establish the rate of separation without a separation accelerator present and the degree of separation, several runs were carried out with the above feed without the accelerator present, with the results reported in Table III below:

Table III
EFFECT OF FEED RATE ON V.I. AND YIELD OF PRODUCTS WITHOUT ANY DIFFUSION ACCELERATOR

| Run No. | Product[1] | Feed rate ml./hr. | V.I. | Vol. fraction of product |
|---|---|---|---|---|
| 1 | T | 0.412 | 127.8 | .33 |
|   | B |       | 56.1  | .67 |
| 2 | T | 0.606 | 120.0 | .36 |
|   | B |       | 65.7  | .64 |
| 3 | T | 0.724 | 114.9 | .49 |
|   | B |       | 63.4  | .51 |
| 4 | T | 0.847 | 110.0 | .51 |
|   | B |       | 66.5  | .49 |

[1] T = Product from top of column. B = Product from bottom of column.

The above data show that as the feed rate is increased, the viscosity index of the top product gradually decreases. However, at the same time, the volume fraction of top high V.I. product gradually increases.

The above petroleum feed was then separated into high V.I. and low V.I. components using several of the separation accelerators of this invention.

Table IV, below, shows the separation obtained when the thermal diffusion is carried out with 50% by volume of the previously described feed and 50% by volume of 1,1,2,2-tetrachloroethane, which is one of the preferred separation accelerators of this invention:

Table IV
CONTINUOUS THERMAL DIFFUSION MCT 30 STOCK+50% VOL. TETRACHLOROETHANE

| Run No. | Product[1] | Feed rate,[2] ml./hr. | V.I. | Vol. fraction of product |
|---|---|---|---|---|
| 1  | T | 0.99  | 111.8 | .72 |
|    | B |       | -4    | .28 |
| 2  | T | 1.53  | 106.4 | .81 |
|    | B |       | -69   | .19 |
| 3  | T | 1.79  | 110.8 | .78 |
|    | B |       | -46.1 | .22 |
| 4  | T | 2.04  | 116.0 | .66 |
|    | B |       | 22.4  | .33 |
| 5  | T | 2.14  | 128.5 | .31 |
|    | B |       | 64.0  | .69 |
| 6  | T | 2.24  | 103.1 | .81 |
|    | B |       | -6.0  | .19 |
| 7  | T | 3.71  | 123.7 | .34 |
|    | B |       | 70.0  | .66 |
| 8  | T | 3.74  | 109.9 | .66 |
|    | B |       | 37.1  | .34 |
| 9  | T | 4.03  | 116.8 | .39 |
|    | B |       | 63.6  | .61 |
| 10 | T | 4.14  | 121.7 | .37 |
|    | B |       | 69.1  | .63 |
| 11 | T | 4.45  | 123.0 | .18 |
|    | B |       | 78.1  | .82 |
| 12 | T | 6.20  | 106.8 | .56 |
|    | B |       | 69.8  | .44 |
| 13 | T | 6.68  | 111.2 | .39 |
|    | B |       | 72.9  | .61 |
| 14 | T | 7.97  | 114.7 | .26 |
|    | B |       | 79.8  | .74 |
| 15 | T | 8.96  | 109.4 | .33 |
|    | B |       | 75.9  | .62 |
| 16 | T | 9.05  | 93.2  | .90 |
|    | B |       | 41.5  | .10 |
| 17 | T | 10.12 | 111.9 | .27 |
|    | B |       | 80.2  | .73 |
| 18 | T | 11.45 | 105.9 | .36 |
|    | B |       | 79.6  | .64 |
| 19 | T | 13.60 | 97.8  | .60 |
|    | B |       | 74.4  | .40 |
| 20 | T | 17.96 | 92.0  | .50 |
|    | B |       | 80.6  | .50 |

[1] T=Product from top of column. B=Product from bottom of column.
[2] Based on solvent free feed.

It will be noted from the above data that there is a substantial increase in the quality and quantity of the desired product obtained with this particular accelerator. It will also be noted that, as the rate increases, the viscosity index generally declines and the amount of high viscosity product generally increases. However, within these limits there is a substantial increase in the volume of product at substantially the same viscosity index.

A similar separation was carried out using xylene as the separation accelerator with the above lubricating stock, and the results reported below in Table V:

Table V

CONTINUOUS THERMAL DIFFUSION MCT 30 STOCK+50% VOL. MIXED XYLENES

| Run No. | Product | Feed rate ml./hr. | V.I. | Vol. fraction of product |
|---|---|---|---|---|
| 1 | T | 0.97 | 135.5 | .20 |
|   | B |      | 74.5  | .80 |
| 2 | T | 2.01 | 126.2 | .37 |
|   | B |      | 65.8  | .63 |
| 3 | T | 2.22 | 122.0 | .32 |
|   | B |      | 70.0  | .68 |
| 4 | T | 2.44 | 134.5 | .14 |
|   | B |      | 79.7  | .86 |
| 5 | T | 2.60 | 126.4 | .34 |
|   | B |      | 72.5  | .66 |
| 6 | T | 2.81 | 119.0 | .47 |
|   | B |      | 66.6  | .53 |
| 7 | T | 2.83 | 123.1 | .40 |
|   | B |      | 63.3  | .60 |
| 8 | T | 3.14 | 123.4 | .29 |
|   | B |      | 73.8  | .71 |
| 9 | T | 4.26 | 122.2 | .19 |
|   | B |      | 79.5  | .81 |
| 10 | T | 4.27 | 107.9 | .46 |
|    | B |      | 71.9  | .54 |
| 11 | T | 7.88 | 107.7 | .25 |
|    | B |      | 83.1  | .75 |

For purposes of comparison with compounds not coming within the scope of our accelerators, normal decane and 1,2-dibromoethane were compared with chlorobenzene. The first two compounds come within the scope of our inventive separation accelerators. The results are described below in Table VI:

Table VI

CONTINUOUS THERMAL DIFFUSION MCT 30 STOCK+50% VOL. VARIOUS DILUENTS

| Run No. | Product | Feed rate ml./hr. | V.I. | Vol. fraction of product |
|---|---|---|---|---|
| n-Decane: | | | | |
| 1 | T | 2.13 | 129.5 | .24 |
|   | B |      | 77.0  | .76 |
| 2 | T | 2.60 | 124.3 | .32 |
|   | B |      | 74.5  | .68 |
| 3 | T | 2.79 | 121.8 | .33 |
|   | B |      | 73.7  | .67 |
| 1,2-dibromoethane: | | | | |
| 4 | T | 0.90 | 115.8 | .70 |
|   | B |      | <0    | .29 |
| 5 | T | 2.44 | 112.4 | .66 |
|   | B |      | 19.8  | .34 |
| 6 | T | 6.30 | 110.7 | .69 |
|   | B |      | 38.7  | .31 |
| 7 | T | 9.44 | 109.0 | .42 |
|   | B |      | 70.6  | .58 |
| Chlorobenzene: | | | | |
| 8 | T | 1.30 | 117.4 | .22 |
|   | B |      | 79.2  | .78 |
| 9 | T | 3.28 | 98.0  | .28 |
|   | B |      | 85.3  | .72 |
| 10 | T | 4.84 | 96.6 | .31 |
|    | B |      | 85.8 | .69 |

In conducting this work, we have unexpectedly found that the concentration of separation accelerator, when added to material to be separated, is important, with the preferred concentration being about 50 volume percent of accelerator to 50 volume percent of the material to be separated. Several runs were carried out to establish this concentration effect with 1,1,2,2-tetrachloroethane. The results are given below in Table VII. The results may be compared with the separation rate obtained for the tetrachloroethane, reported previously in Table IV, for a 50% by volume of accelerator and 50% by volume of material being separated. For ease in comparison, the results of some of these runs are included in Table VII:

Table VII

THE EFFECT OF CONCENTRATION ON SEPARATION RATE AND VISCOSITY INDEX [1]

| Run No. | Product | Feed rate ml./hr. | V.I. | Vol. fraction of product |
|---|---|---|---|---|
| 25% Accelerator: | | | | |
| 1 | T | 2.420 | 116.8 | .36 |
|   | B |       | 64.4  | .64 |
| 2 | T | 3.826 | 113.5 | .34 |
|   | B |       | 77.3  | .66 |
| 3 | T | 5.200 | 108.0 | .24 |
|   | B |       | 77.7  | .76 |
| 4 | T | 9.115 | 100.8 | .35 |
|   | B |       | 84.1  | .65 |
| 50% Accelerator: | | | | |
| 5 | T | 2.04 | 116.0 | .66 |
|   | B |      | 22.4  | .33 |
| 6 | T | 3.74 | 109.9 | .66 |
|   | B |      | 37.1  | .34 |
| 7 | T | 4.45 | 123.0 | .18 |
|   | B |      | 78.1  | .82 |
| 8 | T | 7.97 | 114.7 | .26 |
|   | B |      | 79.8  | .74 |
| 75% Accelerator: | | | | |
| 9 | T | 2.212 | 111.8 | .67 |
|   | B |       | 26.1  | .33 |
| 10 | T | 3.846 | 110.3 | .58 |
|    | B |       | 55.0  | .42 |
| 11 | T | 5.426 | 107.4 | .45 |
|    | B |       | 68.3  | .55 |
| 12 | T | 8.142 | 104.0 | .51 |
|    | B |       | 75.0  | .49 |

[1] Continuous thermal diffusion MCT 30 stock.

In order to further show the effect for the increase in rate obtained in accordance with this invention wherein a top product of 130 viscosity index is to be obtained at a 20–30% yield level, runs were carried out using the oil to be separated without a diluent and with two diluents which did not come within the scope of this invention and with four diluents which do come within the scope of this invention. These data are reported in Table VIII below:

Table VIII

RELATIVE FEED RATES FOR 130 V.I. TOP PRODUCT FROM MCT 30 STOCK

| Diluent | Vol. percent diluent on feed | Relative feed rates for yield | |
|---|---|---|---|
|   |   | 20% | 30% |
| None | 0 | 1.00 (*0.017) | 1.00 (*0.014) |
| 1,1,2,2,-tetrachloroethane | 25 | 3.82 | 3.79 |
|   | 50 | 7.07 | 6.93 |
|   | 75 | 5.71 | 5.52 |
| 1,2-dibromoethane | 50 | 9.73 | 9.01 |
| n-Decane | 50 | 4.04 | 4.00 |
| Xylenes | 50 | 4.40 | 4.15 |
| Chlorobenzene | 50 | ([1]) | ([1]) |
| n-Butanol | 50 | 1.44 | 1.35 |

*Corresponding absolute feed rate v./v./hr.
[1] 130 V.I. unobtainable even at zero feed rate.

The above table clearly shows that the separation accelerators of this invention result in between about 400 to 1000% rate increase over separation without an accelerator. The data also shows that chlorobenzene has a detrimental effect on the rate of separation.

EXAMPLE 2

In order to show the efficiency of this process in separating wax and low and high V.I. components from a lubricating stock, the following batch process was carried out. The equipment and operating temperatures were the same as those described in Example 1. The run lasted about a week and furnished ten fractions which were stripped of accelerator and weighed. The waxy fractions were quantitatively dewaxed at 0° F. using 40 milliliters of ethylene dichloride per gram waxy oil. The thermal diffusion was carried out in a batch process on oil plus 50% by volume of one of the accelerators of this invention, namely, 1,1,2,2-tetrachloroethane. The oil feed used was a phenol extracted, waxy 30 grade lube stock from Western Canadian crude. The results of this separation are given below in Table IX:

*Table IX*

BATCH THERMAL DIFFUSION OF 50% MCT 30 DISTIL-IN TETRACHLOROETHANE

| Fraction No. | Wt. percent on feed | Oil content, percent wt. | Dewaxed oil, wt. percent on feed | Wax Wt. percent on feed | Wax M.P., °F. |
|---|---|---|---|---|---|
| 1 | 12.78 | 14.1 | 1.80 | 10.98 | 151.5 |
| 2 | 18.89 | 45.4 | 8.57 | 10.32 | 137.0 |
| 3 | 18.56 | 89.6 | 16.64 | 1.92 | 127.5 |
| 4 | 17.42 | | | | |
| 5 | 11.62 | | | | |
| 6 | 6.48 | | | | |
| 7 | 4.36 | | | | |
| 8 | 3.61 | | | | |
| 9 | 3.26 | | | | |
| 10 | 3.00 | | | | |
| Feed | 100.0 | 81.3 | 81.3 | 18.70 | 149.0 |

These data are represented graphically in FIGURE 4 of the accompanying drawings. From the above table and the accompanying drawing, it is noted that all of the wax is present in the first three fractions of the separated product. The wax is associated with the high V.I. product. These fractions, however, may be easily dewaxed in a conventional dewaxing process, or may be subsequently charged to additional thermal diffusion columns wherein the wax can be readily separated from the high V.I. oil.

The invention is not intended to be limited to the examples given above, but only by the appended claims.

What is claimed is:

1. A process for improving the rate of separation by thermal diffusion of a petroleum lubricating stock which comprises two or more dissimilar components that are liquid under the conditions of separation; which comprises mixing with petroleum lubricating stock a separation accelerator selected from the group consisting of n-decane, xylene, 1,1,2,2-tetrachloroethane, and 1,2-dibromoethane; in the ratio of separation accelerator to petroleum lubricating stock of about 25/75 to 75/25, introducing the mixture into a substantially vertical slit, having a narrow width, which is formed by two smooth surfaces; providing a temperature gradient across said slit by maintaining one of said surfaces at a higher temperature than the other and continuously withdrawing at one end of said slit a fraction containing a greater concentration of high V.I. lubricating oil, and continuously withdrawing from the other end of said slit a second fraction containing a greater concentration of low V.I. lubricating oil.

2. A method of improving the rate of separation of a petroleum lubricating stock into high V.I. and low V.I. components by thermal diffusion, the said lubricating stock being liquid under conditions of separation, which comprises mixing the lubricating stock to be separated with a separation accelerator selected from the group consisting of n-decane, xylene, 1,1,2,2-tetrachloroethane, and 1,2-dibromoethane, in a ratio of about 1 to 1 part by volume of the accelerator to the lubricating stock being separated, introducing said mixture into a substantially vertical slit having a narrow width which is formed by two smooth surfaces, providing a temperature gradient across said slit by maintaining one of said surfaces at a higher temperature than the other, and continuously withdrawing from one part of said slit a fraction containing the high V.I. components, and continuously withdrawing from another part of said slit a second fraction containing the low V.I. components.

3. The process of claim 2 where the hot wall temperature is 200–450° F. and the cold wall temperature 100 to 200° F.

4. The process of claim 2 wherein the temperature gradient between the hot and cold walls is 100 to 400° F.

5. The process of claim 2 wherein the width of the slit opening is 0.010 to 0.060 inch.

6. A method of improving the rate of separation of a petroleum lubricating stock in a continuous thermal diffusion operation wherein the lubricating stock is maintained in the liquid state under the conditions of separation, which comprises mixing the lubricating stock to be separated with a separation accelerator selected from the group consisting of n-decane, xylene, 1,1,2,2-tetrachloroethane, and 1,2-dibromoethane, in a ratio of separation accelerator to petroleum lubricating stock of about 35/65 to 65/35, introducing said mixture into a substantially vertical slit having a width of about 0.02 to 0.04 inch which is formed by two smooth surfaces, providing a temperature gradient of about 100 to 400° F. across said slit and maintaining one of said surfaces at a temperature of −50 to +300° F., the other, at a temperature of +50 to 500° F., and continuously withdrawing from the top of said slit a fraction containing the high V.I. oil and continuously withdrawing from the bottom of said slit a low V.I. oil.

7. The process of claim 6 wherein the feed rate is 0.010 to 5.0 U.S. gallons/day/sq. ft. surface.

8. An improved process for separation of wax from a waxy oil containing high and low viscosity index oil components, comprising adding to said waxy oil mixture a member of the group consisting of n-decane, xylene, 1,1,2,2-tetrachloroethane, and 1,2-dibromoethane, in a ratio of separation accelerator to waxy oil of about 25/75 to 75/25, introducing the mixture into a series of two or more thermal diffusion columns each made up of vertical slits having narrow widths which slits are formed by two concentric surfaces and which are provided with a temperature gradient across said slit, withdrawing from the bottom of the first column a low V.I. oil and withdrawing from the top of the first column a mixture of wax and high V.I. oil, charging this mixture to a second thermal diffusion column, and separating from the bottom of the said column an oil of intermediate V.I. and from the top of the column a fraction containing substantially all the wax and some high V.I. oil, charging this mixture to another thermal diffusion column, separating at the bottom of the latter column a high V.I. oil and from the top of said column a product which is substantially all wax.

9. In a process of thermal diffusion wherein a petroleum lubricating stock is separated into high V.I. and low V.I. components, by charging the feed stock into a thermal diffusion column, the improvement which comprises increasing the rate of separation of high V.I. and low V.I. components by factor of 4 to 10, by adding to said material to be separated a separation accelerator from the group consisting of n-decane, xylene, 1,1,2,2-tetrachloroethane, and 1,2-dibromoethane, in a ratio of separation accelerator to petroleum lubricating stock of about 25/75 to 75/25, charging the mixture to the thermal diffusion column, and separating from the top of the column at an increased rate the high V.I. oils, and separating from the bottom of the column at the same increased rate the low V.I. oils.

10. The process of claim 9 wherein the separation accelerator is n-decane.

11. The process of claim 9 wherein the separation accelerator is xylene.

12. The process of claim 9 wherein the separation accelerator is 1,1,2,2-tetrachloroethane.

13. The process of claim 9 wherein the separation accelerator is 1,2-dibromoethane.

14. A liquid thermal diffusion process for separating dissimilar hydrocarbon materials which comprises two or more dissimilar hydrocarbon components that are liquid under the conditions of separation which comprises mixing the materials to be separated with a separation accelerator selected from the group consisting of n-decane, xylene, 1,1,2,2-tetrachloroethane and 1,2-dibromoethane in a ratio of separation accelerator to hydrocarbon of about 25/75 to 75/25, introducing the mixture into a slit having a narrow width which is formed by two smooth surfaces, providing a temperature gradient across said slit by maintaining one of said surfaces at a higher temperature than the other and continuously withdrawing from one part of said slit a fraction containing a greater concentration of one of said dissimilar components and continuously withdrawing from another part of said slit a second fraction containing a greater concentration of the other dissimilar components.

References Cited by the Examiner

UNITED STATES PATENTS 2,541,070   2/51   Jones et al. _____ 208—308

OTHER REFERENCES

"Industrial and Engineering Chemistry," vol. 47, No. 2, February 1955, pages 202 to 215.

ALPHONSO D. SULLIVAN, *Primary Examiner.*

JOSEPH R. LIBERMAN, *Examiner.*